United States Patent Office 3,324,197
Patented June 6, 1967

3,324,197
COATING COMPOSITIONS CONTAINING A CO-
POLYMER OF A CONJUGATED DIENE HY-
DROCARBON AND UNSATURATED CYCLIC
HYDROCARBON, A DIMETHYLOL PHENOL,
AND A POLYEPOXIDE
Carl G. Schwarzer, Walnut Creek, Calif., assignor to Shell
Oil Company, New York, N.Y., a corporation of
Delaware
No Drawing. Filed Aug. 26, 1964, Ser. No. 392,285
5 Claims. (Cl. 260—831)

This invention relates to new and improved coating compositions. More particularly, the invention relates to coating compositions comprising (1) a liquid polymer of diethylenically unsaturated hydrocarbons having conjugated double bonds and (2) a dimethylolphenolic resin.

Polymerization products of diethylenically unsaturated hydrocarbons such as butadiene have been found to be useful in their ability to be converted into tough, impact resistance films for coating metal. Such films can be obtained by applying the liquid to the metal and baking the compositions. These films are especially useful for coating sheet metal used in manufacturing cans for foodstuffs and beverages, i.e., as can liners for tin plates used by the food packing industry to make tin cans. The resin is applied as a very thin coat and requires no modification other than the incorporation of a metal wetting agent to assure uniform coating. These tin resin films form excellent coatings which are moderately flexible and exhibit exceptional water and chemical resistance. However, the resins cannot be effectively applied in thicker films than about 0.7 mil at maximum. This restriction has resulted in the exclusion of the use of the resin for many desirable applications, such as exterior and interior pipe coatings, auto body coats, pail and drum coats and the like where materials which may be applied in thicker coats which may then be easily dried or baked onto the surface are necessary.

It is an object of this invention to provide a resin coating composition which may be applied in thickness as high as 5 mils or higher in a single application and which requires only moderate baking schedules. It is an object of the invention to provide coating compositions which are flexible, have excellent adhesion and impact strength as well as exhibiting exceptional water and chemical resistance. These and other objects will be apparent from the following description of the invention.

The novel coating compositions of this invention comprise (1) a liquid polymer of a diethylenically unsaturated hydrocarbon having conjugated double bonds and (2) a dimethylolphenolic resin.

It has been found that the resin compositions of this invention may be applied in thicknesses up to as high as 5 mils or higher in a single application. These resin coating compositions are flexible, have excellent adhesion, and possess unusually good impact strength as well as excellent water resistance, both hot and cold, and have outstanding brine or salt spray resistance. These compositions are ideal for coating pipes, where in addition to the above requirements, the resin coating must be able to withstand 100–160° F. pipe line temperatures, have no cold flow, be resistant to alkali, acid, oil and gas, and be low in cost. The compositions of this invention possess these properties and advantages. In addition, they may be used as primer coats for automobiles as well as for the interior coatings for pails, drums and various other containers. The resins may also be used as wire enamels where great flexibility and good dielectric properties are necessary, as well as for glass cloth laminates, etc.

*The components of the composition of this invention.—
The polymers*

Broadly, the diethylenically unsaturated hydrocarbon polymers which may be used are liquid polymeric compositions of relatively low molecular weight, ranging from about 500 to about 8000, as determined by the ebullioscopic method which are the products of the polymerization of a conjugated diethylenically unsaturated hydrocarbon either alone or with another similar comonomer, or with a minor molar proportion of a polymerizable, olefinically unsaturated coreactant which acts as a molecular weight moderator such as limonene, vinylcyclohexane, unsaturated carboxylic acid, unsaturated halides, unsaturated alcohols, unsaturated ethers, polyolefins, or unsaturated carbonyl compounds, or with 2 or more of these or similar coreactants. The feature which distinguishes all liquid diethylenically unsaturated hydrocarbon polymers suitable for use in this invention is that at least a substantial proportion of their diolefin units are in 1,4-configuration. This means that a substantial part of the carbon-carbon bond in these polymers are present in the backbone of the polymer chain itself, and not in side groups which branch off from the chain. It will be apparent that the suitability of some of these copolymers may be adversely affected by inclusion of certain coreactants, e.g., such as cause steric hindrance of access to the internal double bond, and such as provide groups that are independently reactive with anhydride, causing undesired cross-linking.

The invention is particularly applicable to compositions containing a liquid copolymer of mesityl oxide with conjugated diethylenically unsaturated hydrocarbons which are described in U.S. Patent No. 2,986,580 to P. A. Devlin and the adducts thereof with an organic unsaturated cyclic anhydride such as maleic anhydrides and disclosed in copending application Ser. No. 109,843, filed May 15, 1961. The products described in said patent and copending application are preferred starting materials for the production of the compositions of this invention. The disclosures of said patent and said copending application with respect to the preparation and properties of the copolymers of mesityl oxide and diolefinically unsaturated hydrocarbons and the organic unsaturated cyclic anhydride adducts thereof are incorporated herein by reference.

The feature which distinguishes the liquid polymers suitable for use in this invention, as stated above, is that a substantial proportion of their diolefinic units are in 1,4-configuration. Those polymers having a high proportion of 1,4 addition, e.g., 50% or more, permit greater ease of forming the desired anhydride addition product and incorporation of larger amounts of anhydride without formation of generally undesired cloudy reaction products or gels. Useful results are obtained, however, with polymers having as little as 25%, but preferably at least between 30 and 40% 1,4 addition. The invention is, in general, applicable to liquid polymers having 25% or more 1,4 structure and having average molecular weights in the range from about 500 to about 8000 or somewhat higher.

The proportion of 1,4 addition in polymerization of conjugated olefinically unsaturated compounds is essentially a function of the reaction conditions, including the catalyst employed. These conditions determine the reaction mechanism and the resulting structure. Homopolymers and copolymers suitable for use in this invention result particularly from free-radical mechanisms, such as are found to occur in the presence of free radical generators, e.g., peroxides. Typical conditions for the preparation of such compounds are described in said Devlin patent. Useful liquid diolefinic polymers can also be prepared in ionic reactions catalyzed by Friedel-Crafts type catalysts, such as described in U.S. 2,550,695 to Hillyer et al. and in certain alkali metal catalyzed ionic reactions such as described in U.S. 2,631,175 to Crouch. The structure of the latter polymers is disscussed in "Liquid Polybutadienes" by Crouch et al., Ind. and Eng. Chem., 47, 2091–2095 (1956). Several polymers which are useful in this invention are materials of commerce.

To provide an illustration of polymers used in one preferred embodiment of this invention, the mesityl oxide-diolefin copolymers and their preparation will be briefly described. More complete information concerning them is given in said Devlin patent. The diolefins which may be employed for producing the mesityl oxide-diolefin copolymers are any of the conjugated diolefinic hydrocarbons, but those having no more than 10 carbon atoms are preferred. Most preferred is 1,3-butadiene, and this will generally be referred to in the following description.

In general, the preferred mode of preparing copolymers of mesityl oxide and diolefins consists of dissolving from 1 to 5 parts of diolefin in 10 parts of mesityl oxide and carrying out the polymerization in the liquid phase at temperatures between about 75° C. and 175° C. The reaction may be carried out without polymerization catalyst but is preferably carried out with from about 0.5 to about 40% by weight, based on diolefin, of a free radical generating polymerization catalyst, suitably a peroxide and most preferably di-tert.-butyl peroxide.

The mesityl oxide-diolefin copolymers are mobile to viscous, clear, light colored liquids whose molecular weight is preferably between about 500 and about 8000 and most preferably between 700 and 500. Copolymers containing from about 2 to about 35% combined mesityl oxide on a molar basis, and especially those containing from 3 to about 18% are preferred for the preparation of coating compositions.

The copolymers are soluble in aliphatic and aromatic hydrocarbon solvents such as isoctane or benzene, in ketones such as methyl ethyl ketone and in ethers such as ethyl ether.

Aside from the carbonylic content of these copolymers, they contain primarily polydiene structures. Approximately 20% of the butadiene is present as the 1,2 structure and approximately 80% is combined into the resin as the 1,4 addition product. When further characterized stereochemically, the product shows about 20% of the 1,4 addition product to exist in the cis form and about 80% of the 1,4 addition production in the trans form.

The 1,2-addition structure and the 1,4-addition structure of butadiene may be represented graphically as follows:

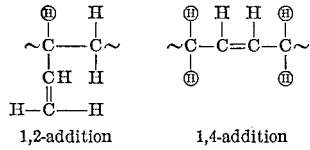

1,2-addition     1,4-addition

In these illustrations, the allylic hydrogen atoms, i.e., those hydrogens attached to a carbon atom which is directly connected to a carbon atom of a carbon-carbon double bond, are shown as ⒽIt. The 1,4 structure contains four allylic hydrogens and the 1,2-structure only one. These allylic hydrogens are more reactive than other hydrogens in the molecule. It is believed that the addition of unsaturated anhydride to polymer, according to this invention, takes place predominantly by a direct addition mechanism at one of the allylic hydrogens in the chain, as illustrated.

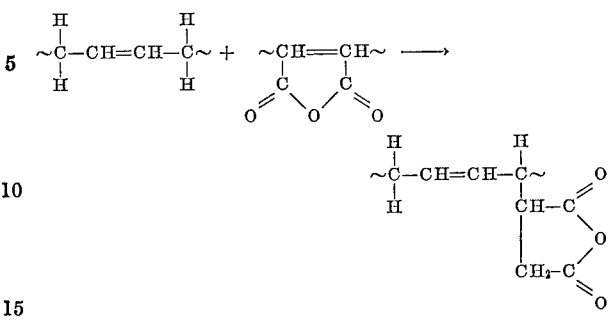

Other similar useful polymers are the copolymers of conjugated diolefins, alpha, beta-ethylenically unsaturated aldehyde, such as acrolein, and mesityl oxide, as described in copending U.S. Ser. No. 101,634, of Devlin and Bergman, filed Apr. 10, 1961.

For reasons of convenience and suitability, it is generally preferred to use maleic anhydride in the practice of this invention. Useful results can also be obtained, however, by using in its place other organic, cyclic unsaturated acid anhydrides, such as tetrahydrophthalic, itaconic, citraconic, aconitic, dimethyl maleic or diethyl maleic anhydrides and the like, as well as the corresponding unsaturated dicarboxylic acids. Anhydrides carrying non-hydrocarbon substituents may be used, as, for example, chloromaleic anhydride, chloroglutaconic anhydride or hydroxyglutaconic anhydride.

The dimethylolphenolic resins

The dimethylolphenolic resins which are used in the compositions of the invention may be resinous phenols having the formula

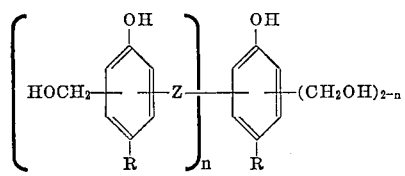

wherein Z is —CH$_2$—, —CH$_2$OCH$_2$— or

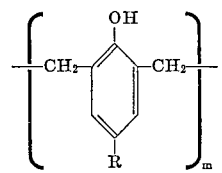

R is hydrogen, hydrocarbyl radical containing from one to about 18 carbon atoms, —CH$_2$OH or halogen (Cl, Br, F), $n$ is zero or 1, and $m$ is an integer from 0–12.

These resins are often referred to as resoles and are prepared by reacting a phenol with an excess of formaldehyde in the presence of an alkaline catalyst. For oil solubility a phenol having a para-substituted hydrocarbon group having at least 4 carbon atoms such as tert-butyl, tert-amyl, hexyl, nonyl, dodecyl, etc. group is preferred. A number of commercial preparations may be used such as the Catalin Resins 8743 and 9672 and Bakelite CKR-1634. These resins have relatively high methylol contents. Mixtures of dimethylolphenolic resins such as 2,6-dimethylol-4-nonylphenol and dibenzyl ether of 2,6-dimethylol-4-nonylphenol may also be used. Another desirable phenolic resin material may be prepared by reacting a mixture of phenol and a suitable para-substituted phenol with formaldehyde thereby resulting in a resin having a number of phenolic rings and an occasional methylol-group available for cross-linking. Generally, the preferred dimethylol phenolic resins used in the coating compositions of the invention have molecular weights between about 210 and 3000.

In another embodiment of the coating compositions of the invention wherein the cyclic unsaturated acid anhydride adducts of the conjugated diethylenically unsaturated hydrocarbon-mesityl oxide copolymers are utilized, the composition may also contain an epoxide mixed therewith such as is described in my U.S. Patent No. 3,113,036. The disclosures of said patent with respect to the preparation of such mixtures are incorporated herein by reference. The epoxide is preferably present in a sufficient amount to provide at least one epoxy group per anhydride group. Suitable epoxides which may be used comprise those materials, possessing more than one vicinal epoxy, or oxirane, group

per molecule. Those are preferred which are soluble in the above described polymers or in solutions of such polymers with suitable solvents at atmospheric or moderately elevated temperatures. The polyepoxides may be saturated or unsaturated, aliphatic, cycloaliphatic, aromatic or heterocyclic and may be substituted with non-interfering substituents such as chlorine, alkoxy groups and the like. They may be monomeric of polymeric.

For clarity, many of the polyepoxides, and particularly those of the polymeric type are described in terms of "epoxy equivalent" values. This expression refers to the average number of epoxy groups contained in the average molecule. The epoxy equivalent value is obtained by dividing the average molecular weight of the polyepoxide by the epoxide equivalent weight. The epoxide equivalent weight is determined by heating a sample of the polyepoxide with an excess of pyridinium chloride dissolved in pyridine and back titrating the excess pyridinium chloride with 0.1 N sodium hydroxide to the phenolphthalein end point. The epoxide value is calculated by considering one HCl as equivalent to one epoxide group. This method is used to obtain epoxide equivalent values referred to herein.

If the polyepoxide material is a single compound having all of the epoxy groups intact, the epoxy equivalent value will be an integer, such as 2, 3, 4, and the like. However, in the case of polymeric polyepoxides the material may contain some of the monomeric epoxide or have some of the epoxy groups hydrated or otherwise reacted and/or contain macromolecules of various molecular weights, so that the epoxy equivalency may be quite low and include fractional values greater than 1.0. Another suitable description of epoxide content of an epoxy compound is in terms of epoxy equivalents per 100 grams.

The monomeric polyepoxide compounds may be exemplified by the following:

vinyl cyclohexene dioxide,
epoxidized soybean oil,
butadiene dioxide,
1,4-bis(2,3-epoxypropoxy)benzene,
1,3-bis(2,3-epoxypropoxy)benzene,
4,4'-bis(2,3-epoxypropoxy)diphenyl ether,
1,8-bis(2,3-epoxypropoxy)octane,
1,4-bis(2,3-epoxypropoxy)cyclohexane,
4,4'-bis(2-hydroxy-3,4-epoxybutoxy)diphenyldimethylmethane,
1,3-bis(4,5-epoxypentoxy)-5-chlorobenzene,
1,4-bis(3,4-epoxybutoxy)-2-chlorocyclohexane,
diglicidyl ether,
1,3-bis(2-hydroxy-3,4-epoxybutoxy)benzene,
1,4-bis(2-hydroxy-4,5-epoxypentoxy)benzene,
1,2,5,6-di-epoxy-3-hexene,
1,2,5,6-diepoxyhexane, and
1,2,3,4-tetra(2-hydroxy-3,4-epoxybutoxy)butane.

Other examples of this type include the glycidiyl polyethers of the polyhydric phenols obtained by reacting a polyhydric phenol with a great excess, e.g., 4 to 10 mol excess, of a halogen-containing epoxide in an alkaline medium. Thus, Polyether A as described in U.S. 2,633,458 to Shokal, which is a concentrate of 2,2-bis(2,3-epoxypropoxyphenyl)propane, is obtained by reacting bisphenol-A, (2,2-bis(4-hydroxyphenyl)propane) with an excess of epichlorohydrin. Other polyhydric phenols that can be used for this purpose include resorcinol, catechol, hydroquinone, methyl resorcinol, or polynuclear phenols, such as 2,2-bis(4-hydroxyphenyl)butane, 4,4'-dihydrobenzophenone, bis(4-hydroxyphenyl)ethane, and 1,5-dihydroxynaphthalene. The halogen-containing epoxides may be further exemplified by 3-chloro-1,2-epoxybutane, 3-bromo-1,3-epoxyhexane, 3-chloro-1,2-epoxyoctane and the like. Another very suitable group of epoxides comprises epoxidized cyclohexane compounds containing at least two epoxycyclohexyl rings. Typical of these are 3,4-epoxycyclohexylmethyl-3,4-epoxycyclohexane-carboxylate and the corresponding homologs having alkyl substituents in the cyclohexane rings. These and related compounds are described in substantial detail in U.S. Patents 2,890,194 through 2,890,197 and in U.S. 2,917,469.

Another very suitable group of epoxides comprising the polyglycidyl ethers of tetraphenols is described in U.S. 2,806,016 to Schwarzer. Typical of these is the polyglycidyl ether of 1,1,2,2-tetrakis(hydroxyphenyl)ethane described in Example I of said patent, which has a melting point of about 85° C. and contains 0.452 epoxy equivalent per 100 grams. Examples of the polymeric polyepoxides, include the polyepoxypolyhydroxy polyethers obtained by reacting, preferably in an alkaline or an acid medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bisphenol and bis-(2,3-epoxy-2-methylpropyl)ether, the reaction product of resorcinol and bis(2,3-epoxypropyl)ether, and the reaction product of catechol and bis(2,3-epoxypropyl)ether.

A further group of polymeric polyepoxides comprises the hydroxy-substituted polyepoxypolyethers obtained by reacting, preferably in an alkaline medium, a slight excess, e.g., 0.5 to 3 mol excess, of a halogen-containing epoxide as described above, with any of the aforedescribed polyhydric phenols, such as resorcinol, catechol, bisphenol, bis(2,2'-dihydroxy-dinaphthyl)methane, and the like.

Also included within this group are the polyepoxide polyethers obtained by reacting, preferably in the presence of an acid-acting compound, such as hydrofluoric acid, one of the aforedescribed halogen-containing epoxides with water or a polyhydric alcohol, such as glycerol, propylene glycol, ethylene glycol, trimethylene glycol, butylene glycol, and the like, and subsequently treating the resulting product with an alkaline component as described in U.S. Patent No. 3,058,921 to Pannell.

Other polymeric polyepoxide compounds include the polymers and copolymers of the epoxy-containing monomers possessing at least one polymerizable ethylenic linkage. When such monomers are polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomers, such as styrene, butadiene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl 2,3-epoxypropyl ether), poly(2,3-epoxypropyl crotonate), allyl 2,3-epoxypropyl ether-styrene copolymer, methallyl 3,4-epoxybutyl ether-allyl benzoate copolymer, poly(vinyl 2,3-epoxypropyl ether), allyl glycidyl ether-vinyl acetate copolymer and poly(4-glycidyloxy-styrene).

Other particularly suitable polyepoxides include the condensation products of polycarboxylic acids, polycarboxylic-acid anhydrides and mixtures thereof with from 1.5 to four times the chemical equivalent amount of a polyepoxide containing more than one vic-epoxy group, the equivalent amount referring to the amount needed to furnish one acid group per epoxy group. The preparation of such compounds and the various starting materials from which they can be prepared are described in U.S. 2,970,983 to Newey. A representative general formula of these compounds, when prepared from dibasic acids, is as follows:

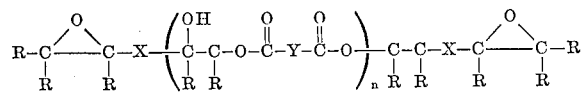

wherein R is hydrogen or hydrocarbon radical, X is organic radical, Y is residue or the dibasic acid and $n$ is an integer and preferably 1 to 10. Particularly preferred are the condensation products of dimer or trimer acids obtained by polymerizing unsaturated fatty acids such as soybean oil fatty acids and the like with diepoxides of the type of Polyether A of said U.S. 2,633,458 to Shokal.

A preferred group of epoxy-containing organic materials are the monomeric and polymeric glycidyl polyethers of dihydric phenols obtained by reacting epichlorohydrin with a dihydric phenol in an alkaline medium. The monomeric products of this type may be represented by the general formula

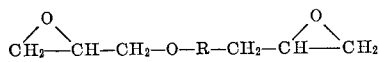

wherein R represents a divalent hydrocarbon radical of the dihydric phenol. The polymeric products will generally not be a single simple molecule but will be a complex mixture of glycidyl polyethers of the general formula

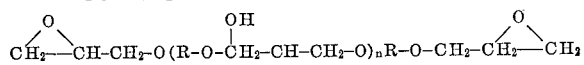

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of materials with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

Preferred polyepoxy derivatives of dihydric phenols are the reaction products of epichlorohydrin and 2,2-bis (4-hydroxy phenyl)propane. The simplest member of this group is the diglycidyl ether of the phenol, 2,2-bis(2,3-epoxypropoxyphenyl)propane, which is commercially available in the form of liquid concentrates containing from 70% to nearly 100% of the named product. The substantially pure compound has a viscosity of about 40 poises at 25° C., a molecular weight of about 340 and an epoxy value of about 0.59 equivalent per 100 grams, corresponding to an epoxy equivalency of about 2. A typical commercial concentrate of about 70–80% of the compound has a viscosity of about 125 to 175 poises at 25° C., a molecular weight of about 350 (measured ebullioscopically in ethylene dichloride), an epoxy value of about 0.50 equivalent per 100 grams and a corresponding epoxy equivalency of 1.75. It is illustrated as Polyether A in U.S. 2,633,458 to Shokal. Other polyepoxy derivatives of dihydric phenols are those of Formula 3 where R stands for —O—C$_6$H$_4$(C$_3$H$_6$)C$_3$H$_4$—O— and $n$ has average values above zero. For example, products in which the average value of $n$ ranges from 0 to about 4 are useful in this invention. Typical of solid products in this range are those having melting points of about 70° C. and about 98° C., molecular weights of about 900 and about 1400, and epoxide values of about 0.20 and about 0.103 equivalent per 100 grams, respectively. They are illustrated as Polyethers D and E in said Shokal patent.

The epoxide and the cyclic unsaturated acid anhydride adducts of the conjugated diethylenically unsaturated hydrocarbon-mesityl oxide copolymers may separately be mixed prior to the addition of the dimethylol phenolic resin or all three of the components may be blended together at one time. The amount of epoxide to be used is expressed as a function of the amount of anhydride present in the composition. Preferably the epoxide utilized is such as to provide at least one epoxy group for each anhydride group present and no more than about 3 epoxy groups per anhydride group.

It may also be desirable to employ a curing catalyst in the compositions. Those catalysts which have been found to be effective are the stannous and zinc oxides and metal salts of organic acids, such as lead, manganese, calcium or cobalt octoate or naphthenate and especially stannous and zinc octoate, as well as the organo titanate compounds such as tetrakis(2-ethylhexyl) orthotitanate and organo tin compounds such as dibutyltin chloride, dibutyltin diacetate, bis(tri-n-butyltin), dibutyltin-di-2-hethyl hexoate, etc. Organic zirconium salts such as zirconium tetraacetylacetonate, zirconium octoate and other organo zirconium salts are also effective. The catalysts are used in amounts of about 0.1 to about 5% by weight.

For many applications, it may be desirable to use an extender in the coating composition especially in industrial use where color of the coating is not particularly important, but where protection is paramount. Suitable extenders include a great variety of inexpensive oil refinery and coal tar products such as various grades of industrial fuel oils and asphalts. These extenders may be used in concentrations of up to as high as 50% by weight of the coating composition without seriously impairing the performance of the coating. The use of extenders greatly lowers the cost of the coatings and in instances where the coatings are exposed to caustic and salt spray, improved performance is achieved.

A variety of fillers and pigments which are conventionally employed in commercial coating compositions may also be employed in the compositions of this invention. Essentially inert fillers include, for example, asbestos or glass floc. Pigments, some of which are particularly desirable because they also impart additional anticorrosion properties to the coating include, for example, titanium dioxide, zinc chromate, red iron oxide, chromic oxide, lead oxides and zinc oxide. Fillers are generally employed in relatively high proportions, e.g., up to 75% based on the resin composition.

The preparation of the maleic or other organic unsaturated cyclic anhydride or corresponding acid adducts of the mesityl oxide diethylenically unsaturated hydrocarbons as briefly stated involves heating a reaction mixture of polymer and anhydride, optionally in the presence of a solvent, to a temperature in the range from 160° to 250° C., and preferably between 180 and 210° C. The reaction is carried out in the absence of oxygen, for example, the reactor is swept with an inert gas before the reagents are added, an inert gas blanket is maintained during the reaction, and an inhibitor of free radical polymerization is present in the reaction mixture. Numerous inhibitors of this type are known. Typical examples of suitable inhibitors are di-tert.-amyl hydroquinone, diphenyl-p-phenylenediamine hydroquinone, diphenylamine and 2,6-di-tert.-butyl-4-methylphenol. The amount of inhibitor of this type usually used is between 0.12 and 5 percent by weight.

In preparing the coating compositions the liquid polymer of the conjugated diethylenically unsaturated hydrocarbon, such as, for example, the mesityl oxide-conjugated diethylenically saturated hydrocarbon copolymer or maleic anhydride adduct thereof, is thoroughly mixed with the dimethylolphenolic resin in a weight ratio of from about 10:1 to about 1:10 respectively. Where an epoxide is also used in the coating composition it may be added in amounts corresponding to from about 5% to about 150% by weight of the combined amounts of polymer and dimethylol phenolic resin. The appropriate amount of catalyst, extender and filler are also mixed therein and the composition is applied to the surface to be coated. The baking temperature is somewhat dependent on the thickness of the coating, as well as the proportions of ingredients. Generally, temperatures between about 200° and 500° F. and preferably between 250° and 450° F. are used. Baking times may be between about 5 and 60 minutes. A particular advantage of the compositions of this invention are the relatively moderate temperatures at which baking may be accomplished. In many formulations, for example, at about 350° F., 5–10 minutes baking time is adequate to produce excellent coatings regardless of the thickness.

The coatings produced are fast-curing, thick, tough, flexible and chemically resistant and may be used for auto undercoats, wire coatings, pipe liner and exterior pipe coatings, metal primers and wherever inexpensive coatings possessing these properties can be used.

The following examples further illustrate this invention but are not to be considered a limitation thereof. The parts and percentages are by weight unless otherwise noted.

A suitable copolymer for use in this invention is prepared by placing mesityl oxide in an autoclave, heating the vessel to 150° C. and adding during a period of several hours a solution of di-tert.-butyl peroxide catalyst in mesityl oxide solution, and butadiene, until approximately 30 parts of butadiene and about 1.5 parts of catalyst per 100 parts of total reaction mixture have been added. Reaction is continued for a period of several hours after addition of reactant and catalyst is discontinued. Product is separated from the unreacted ingredients by Glaisen distillation at about 2 millimeters at 150° C.

A copolymer produced in this manner typically has the following properties:

| | |
|---|---|
| Viscosity, Gardner-Holdt | Z6 to Z7 |
| Color, Gardner | 8 |
| Density, gm./ml. | 0.913 |
| Molecular weight | 2600 |
| Iodine value, gram 1/100 g. (Wijs) | 450 |
| Carbonyl value, equivalents per 100 g. | 0.06 |
| Structure: | |
| Percent carbonyl, as mesityl oxide | 7.8 |
| Percent 1,4 addition of diene | 82 |
| Percent 1,2 addition of diene | 18 | and will hereinafter be referred to as Polymer A.

A similar polymer was prepared by the same method as set forth above except that propylene trimer was substituted for the mesityl oxide. The resulting product had a molecular weight of 1430±70 and 67.3% 1,4 unsaturation (49.4 trans, 17.9 cis) the remainder of the properties being substantially equivalent to those of Polymer A. The polymer will be referred to as Polymer B.

*Example I*

A coating composition was prepared by thoroughly mixing 76% Polymer A (in a 50% methyl isobutyl ketone solution) and 23% of a commercial heat-reactive dimethylol phenol resin having a methylol content of 9–12%, a softening point (Nagel) of 80.0–95.0° C. and a specific gravity at 25° C. of 1.020–1.040 (Catalin Resin 9273). Stannous octoate (1%) was then added to the mixture which was then stirred. The composition was applied to tin plate with a "doctor" blade at a film thickness of 1.0 mil and baked at 400° F. for 15–40 minutes. The coatings were tested and found to have excellent hardness, flexibility, adhesion and impact resistance as well as resistance to solvents such as xylene and methyl isobutyl ketone, and resistance to embrittlement or aging.

*Example II*

A coating composition was prepared by mixing 67% of Polymer A with 30% of a commercial heat-reactive dimethylol phenol resin (Bakelite phenolic resin CKR–1634) to which mixture is added 3% zinc oxide. The resulting mixture was applied to a tinplate at 1.0 mil thickness and baked from 15–40 minutes at 400° F. The coating possessed substantially the same properties as that of Example II.

*Example III*

A coating composition was prepared by mixing 38% Polymer A with 60% of a commercial 2,6-dimethylol-4-nonylphenol (Antara Chemical) and 2% stannous octoate. The composition was spread on a tin plate at 1.0 mil thickness and baked at 400° F. for 5–40 minutes. The coating was found to possess exceptional solvent resistance, impact resistance and hardness as well as excellent flexibility and adhesion.

Other compositions of the type described in the examples above were prepared utilizing zinc octoate and dibutyl tin dichloride catalyst, the baked coatings of which were equivalent to those in the examples above.

*Example IV*

A coating composition was prepared by mixing 69% of Polymer B, 29% of commercial dimethylol-4-nonylphenol and 2% zinc octoate. A film of 1.2 mil thickness was applied on a tin plate and baked for 30 minutes at 350° F. The coating possessed the same excellent properties as the coating of Example III.

*Example V*

A coating composition was prepared by the same method set forth in Example IV except that a commercial polybutadiene resin having the following properties:

| | |
|---|---|
| Specific gravity | 0.9106 |
| Gardner color | <1 |
| Acid number | 0.46 |
| Viscosity 30° C. | 219 |
| 1,4 unsaturation: | |
| Cis _____percent__ | 21.9 |
| Trans _____do____ | 57.4 |
| 1,2 unsaturation _____do____ | 20.6 | was substituted for the Polymer B. The properties of the cured composition were equivalent to those of the coating of Example III.

A reaction product of Polymer A is prepared as follows: 272 parts of polymer and 1.3 parts of 2,5-ditertiary amyl hydroquinone (in the form of the commercial inhibitor "Santovar A") are heated in an agitated kettle to 155° C. while being purged with nitrogen. Nitrogen flow is discontinued, and 15.5 parts of freshly ground maleic anhydride added. The temperature is raised to 190° C and held there for 80 minutes. During this period, the heterogeneous mixture of maleic anhydride and copolymer turns into a clear solution. A vacuum of 16 mm. mercury, absolute, is then pulled on the kettle and the mixture held at a temperature of 180° C. for 15 minutes to remove unconverted maleic anhydride. The product may be recovered as is, or a small amount of solvent added to facilitate its removal from the kettle and further handling. Conveniently, the temperature of the product is reduced, 25 parts of methyl isobutyl ketone added and the product removed for use as desired. The product contains about 5.2 percent maleic anhydride in combined form. The combined maleic anhydride content is determined by extracting unreacted maleic anhydride from the reaction product by means of hot water and then titrating the aqueous extract to determine the amount of uncombined maleic anhydride. This product will hereafter be referred to as Polymer C.

A reaction product containing about 10 percent maleic anhydride is prepared as set forth above by doubling the amount of maleic anhydride in the reaction mixture, conditions remaining otherwise unchanged. This product will be hereafter referred to as Polymer D.

*Example VI*

A coating composition was prepared by mixing 50% of Polymer C, 50% of commercial dimethylol-4-nonylphenol, and 2% stannous octoate. The composition was evenly spread on a tin plate at 1.0 mil thickness and baked at 400° F. from 5 to 40 minutes. After 5 minutes baking time the coatings possessed excellent hardness, flexibility, and resistance to impact, solvents and embrittlement.

*Example VII*

A similar composition to that prepared in Example VI except containing 85% Polymer C and 15% dimethylolnonyl phenol was prepared. The baked coating was equivalent to that of Example VI except for slightly lower hardness and solvent resistance.

*Example VIII*

A coating composition was prepared by mixing 60% of Polymer D and 50% of a commercial heat-reactive dimethylolphenol resin (Bakelite CKR 1634) and 2% stannous octoate which composition was well stirred. The composition was spread evenly on a tin plate at 3.5 mil thickness and baked at 350° F. for 5–40 minutes. After 5 minutes baking time the coating was found to have excellent hardness, flexibility and resistance to impact, solvents and embrittlement. Compositions baked for slightly longer periods (i.e., 15–40 minutes) possessed even greater hardness and solvent resistance.

*Example IX*

A coating composition was prepared by mixing 33% of Polymer C (in 80% solids xylene solution) 33% of dimethylol phenol resin (Bakelite CKR 1634 in 50% methylisobutyl ketone solution), 33% of a liquid epoxy resin obtained by reacting bisphenol A (2,2-bis(4-hydroxyphenyl)propane) with an excess of epichlorohydrin and described in U.S. Patent No. 2,633,458 and having an average molecular weight of about 380 and 2% stannous octoate. The mixture was thoroughly blended and applied to a tin plate in a 5.0–6.0 mil thickness and baked at 350° C. for 5–40 minutes. Such a coating after only 5 minutes of baking possessed exceptional solvent resistance, impact resistance, hardness, flexibility and adhesion.

*Example X*

A coating composition was prepared and treated in the same manner as in Example IX except containing 70% of Polymer C in solution, 15% of the dimethylol phenol resin (Bakelite CKR 1634) in solution, 15% of the same epoxy resin and 2% stannous octoate. The baked coating had properties equivalent to those of Example IX.

*Example XI*

A coating composition was prepared by mixing 32% of Polymer C, 32% dimethylol phenol resin (Bakelite CKR 1634), 34% of a commercial fuel oil (Bunker C–Shell Oil Company) and 2% stannous octoate. The composition was applied to two tin panels at thickness of 3.5–4.0 mils. One sample was baked at 350° F. for 10–20 minutes and the other at 400° F. for 5–10 minutes. Each of the coatings was completely cured and exhibited an extremely high gloss. In testing the coatings in no case did the extender bleed out of the film on aging. The coated panels withstood 1500 hours in a Weatherometer test with only slight chalking which films were also unaffected by 1000 hours of salt spray. The coatings exhibited excellent adhesion, moisture resistance, oil and gas resistance, abrasion and impact resistance and due to the low cost provide ideal piper or container interior coatings. The coatings also were unchanged after 4 hours of extraction with hot methyl ethyl ketone.

In other experiments blown asphalt, coal tar and Dutrex 739 (a commercially available furfural extract of a lubricating oil sulfonation feed) were substituted as extenders in place of the fuel oil and found to result in coatings which were equivalent to those shown by the coating above.

*Example XII*

A coating composition was prepared by mixing 29% of the composition of Polymer A, 19% of dimethylolphenol resin (Bakelite CKR 1634), 50% red iron oxide and 2% dibutyl tin dichloride. A coating of the composition of 1.2 mil thickness after baking for 30 minutes at 350° F. exhibited exceptionally good salt spray, water and weather resistance as well as excellent flexibility and impact resistance thereby qualifying as a useful general purpose coating, especially as an automobile primer coat.

*Example XIII*

A coating composition was prepared by mixing 22% of the reaction product of Polymer C (in 80% solids xylene solution), 22% dimethylol phenol resin (Bakelite CKR 1634) in 50% methyl isobutyl ketone solution, 22% of a liquid epoxy resin (used in Example IX), 32% Dutrex 739 and 2% stannous octoate. The composition was baked on three separate panels at 2–4 minutes at 400° F., 10 minutes at 350° F. and 30 minutes at 300° F. Each of the coatings among other properties possessed extremely high flexibility and good dielectric properties and may be used for wire coatings or glass cloth laminating. Increased stiffness is obtained by increasing the proportion of the dimethylol phenolic resin content of the composition.

I claim as my invention:
1. A coating composition comprising
  (1) a reaction product of a polymer of a conjugated diethylenically unsaturated hydrocarbon having a molecular weight of from about 500 to about 8000 and having at least 25% of its diolefinic units in 1,4-configuration and from 0.1 to about 60% by weight thereof of an unsaturated cyclic anhydride, and
  (2) a dimethylolphenolic compound having the formula

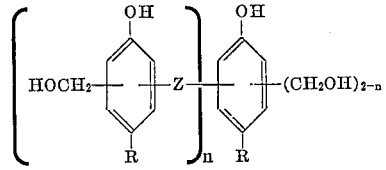

wherein Z is a radical selected from the group consisting of —CH$_2$—, —CH$_2$OCH$_2$— and

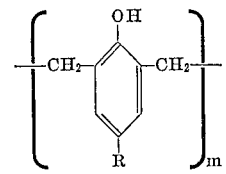

R is selected from the group consisting of hydrogen, hydrocarbyl radicals containing from 1 to about 18 carbon atoms, $CH_2OH$ and halogen, $n$ is selected from 0 and 1, and $m$ is an integer between 0 and 12, the reaction product defined in (1) and the dimethylolphenolic compound defined in (2) being combined in a weight ratio of 10:1 to 1:10.

2. A coating composition comprising
(1) a reaction product of a polymer of a conjugated diethylenically unsaturated hydrocarbon having a molecular weight between about 500 and 8000 and having over 25% of its diolefinic units in 1,4-configuration and from 0.1 to about 60% by weight thereof of an organic unsaturated cyclic anhydride and
(2) a dimethylolphenolic compound having the formula

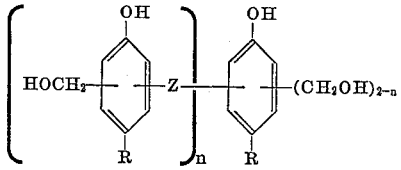

wherein Z is a radical selected from the group consisting of —$CH_2$—, —$CH_2OCH_2$— and

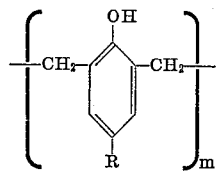

R is selected from the group consisting of hydrogen, hydrocarbyl radicals containing from 1 to about 18 carbon atoms, $CH_2OH$ and halogen, $n$ is selected from 0 and 1, and $m$ is an integer between 0 and 12, the reaction product defined in (1) and the dimethylolphenolic compound defined in (2) being combined in a weight ratio of 10:1 to 1:10.

3. A coating composition comprising
(1) a reaction product of a polymer of a conjugated diethylenically unsaturated hydrocarbon having a molecular weight between about 500 and 8000 and having over 25% of its diolefinic units in 1,4-configuration and from 0.1 to about 60% by weight thereof of an organic unsaturated cyclic anhydride,
(2) an oxirane compound possessing more than one

group per molecule present in an amount sufficient to provide, the reaction product defined in (1) and the dimethylolphenolic compound defined in (2) being combined in a weight ratio of 10:1 to 1:10 per anhydride group, and
(3) a dimethylolphenolic compound having the formula

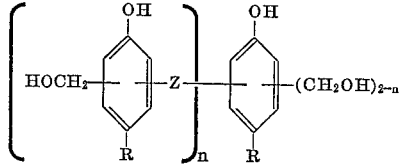

wherein Z is a radical selected from the group consisting of —$CH_2$—, —$CH_2OCH_2$— and

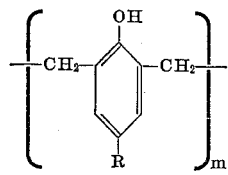

R is selected from the group consisting of hydrogen, hydrocarbyl radicals containing from 1 to about 18 carbon atoms, —$CH_2OH$ and halogen, $n$ is selected from 0 and 1, and $m$ is an integer between 0 and 12.

4. A process for forming a thick coating on a surface comprising applying to said surface a composition comprising.
(1) reaction product of a polymer of a conjugated diethylenically unsaturated hydrocarbon having a molecular weight of from about 500 to about 8000 and having at least 25% of its diolefinic units in 1,4-configuration and from 0.1 to about 60% by weight thereof of an unsaturated cyclic anhydride, and
(2) a dimethylolphenolic compound having the formula

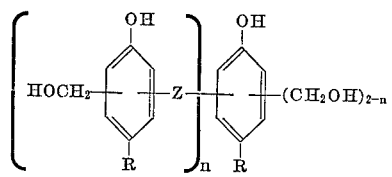

wherein Z is a radical selected from the group consisting of —$CH_2$—, —$CH_2OCH_2$— and

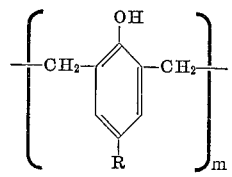

R is selected from the group consisting of hydrogen, hydrocarbyl radicals containing from 1 to about 18 carbon atoms, —$CH_2OH$ and halogen, $n$ is selected from 0 and 1, and $m$ is is an integer between 0 and 12, said reaction product defined in (1) and the dimethylolphenolic compound defined in (2) being combined in a weight ratio of 10:1 to 1:10 and baking said composition at a temperature of from about 200° to about 500° F.

5. A surface coated with a cured composition comprising
(1) a reaction product of a polymer of a conjugated diethylenically unsaturated hydrocarbon having a molecular weight of from about 500 to about 8000 and having at least 25% of its diolefinic units in 1,4-configuration and from 0.1 to 60% by weight of an unsaturated cyclic anhydride and
(2) a dimethylolphenolic compound having the formula

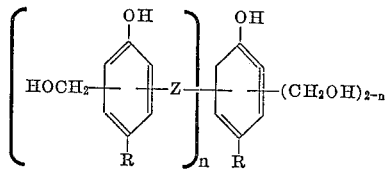

wherein Z is a radical selected from the group consisting of —$CH_2$—, —$CH_2OCH_2$— and

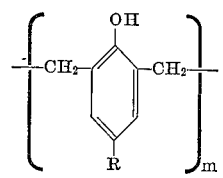

R is selected from the group consisting of hydrogen, hydrocarbyl radicals containing from 1 to about 18 carbon atoms, —$CH_2OH$ and halogen, $n$ is selected from 0 and 1, and $m$ is an integer between 0 and 12, the reaction product defined in (1) and the dimethylolphenolic compound defined in (3) being combined in a weight ratio of 10:1 to 1:10.

References Cited

UNITED STATES PATENTS

| | | | |
|---|---|---|---|
| 2,986,580 | 5/1961 | Devlin | 260—63 |
| 3,206,432 | 9/1965 | Schwarzer | 260—63 |
| 3,215,669 | 11/1965 | Devlin | 260—845 |
| 3,215,670 | 11/1965 | Devlin | 260—63 |

FOREIGN PATENTS 756,269   9/1956   Great Britain.

MURRAY TILLMAN, *Primary Examiner.*

P. LIEBERMAN, *Assistant Examiner.*